United States Patent [19]
Higuchi et al.

[11] Patent Number: 5,945,995
[45] Date of Patent: *Aug. 31, 1999

[54] CAD SYSTEM WHICH AUTOMATICALLY CREATES A 3-DIMENSIONAL SOLID MODEL DIRECTLY FROM A 2-DIMENSIONAL DRAWING

[75] Inventors: Tatsuji Higuchi, Akiruno; Yasuyuki Nishidai, Hachioji, both of Japan

[73] Assignee: Olympus Optical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/656,525
[22] Filed: May 31, 1996
[30] Foreign Application Priority Data Jun. 8, 1995 [JP] Japan .................................. 7-142131

[51] Int. Cl.$^6$ ...................................................... G06F 15/00
[52] U.S. Cl. ............................................................. 345/420
[58] Field of Search ............................ 345/418–20, 433, 345/435; 364/470.03–470.08, 474.22, 474.24, 474.25, 578

[56] References Cited

U.S. PATENT DOCUMENTS 5,701,403  12/1997  Watanabe et al. ....................... 345/419

Primary Examiner—Mark R. Powell
Attorney, Agent, or Firm—Frishauf, Holtz, Goodman, Langer & Chick, P.C.

[57] ABSTRACT

In a design supporting system, projected shape information of a part, for example, solid model definition drawing is input from a shape inputting section based on the drawing formation on the CAD, shape attribute information thereof is input from a shape attribute inputting section, and the projected shape information and shape attribute information are combined and stored in an input information storing section. Further, a 3-dimensional CAD solid model creation command group includes a plurality of 3-dimensional CAD drawing modules used for converting the projected shape information into 3-dimensional information. A control section creates a 3-dimensional CAD solid model by controlling the 3-dimensional CAD drawing modules of the 3-dimensional CAD solid model according to the projected shape information and shape attribute information stored in the storage section.

30 Claims, 21 Drawing Sheets

```
PROJECTION : FRONT SIDE (Z AXIS ⊕ SIDE)

SURFACE INFORMATION
    SURFACE1; (TYPE OF SURFACE)      PLANE
             (LOCATION OF SURFACE)   Z=10
             (POSITION OF SURFACE)   (PERPENDICULAR TO Z AXIS)
             (SUBSTANTIAL DIRECTION) Z AXIS ⊖ SIDE
             (BOUNDARY REGION)       b1

SURFACE2; (TYPE OF SURFACE)      PLANE
             (LOCATION OF SURFACE)   Z=5
             (POSITION OF SURFACE)   (PERPENDICULAR TO Z AXIS)
             (SUBSTANTIAL DIRECTION) Z AXIS ⊖ SIDE
             (BOUNDARY REGION)       b2

SURFACE3; (TYPE OF SURFACE)      PLANE
             (LOCATION OF SURFACE)   Z=20
             (POSITION OF SURFACE)   (PERPENDICULAR TO Z AXIS)
             (SUBSTANTIAL DIRECTION) Z AXIS ⊖ SIDE
             (BOUNDARY REGION)       b3

HOLE INFORMATION
    HOLE; (TYPE OF SURFACE)      CYLINDER
          (LOCATION OF SURFACE)  (x=4.5 y=1.5)
          (POSITION OF SURFACE)  Z AXIS DIRECTION
          (TYPE OF HOLE)         PENETRATION HOLE
          (BOUNDARY REGION)      b4

OUTER SHAPE INFORMATION
          (BOUNDARY REGION)      b5

PROJECTION ; REAR SIDE  (Z AXIS ⊖ SIDE)
  SURFACE INFORMATION
    SURFACE4; (TYPE OF SURFACE)      PLANE
             (LOCATION OF SURFACE)   Z=0
             (POSITION OF SURFACE)   (PERPENDICULAR TO Z AXIS)
             (SUBSTANTIAL DIRECTION) Z AXIS ⊕ SIDE
             (BOUNDARY REGION)       b6
```

F I G. 7

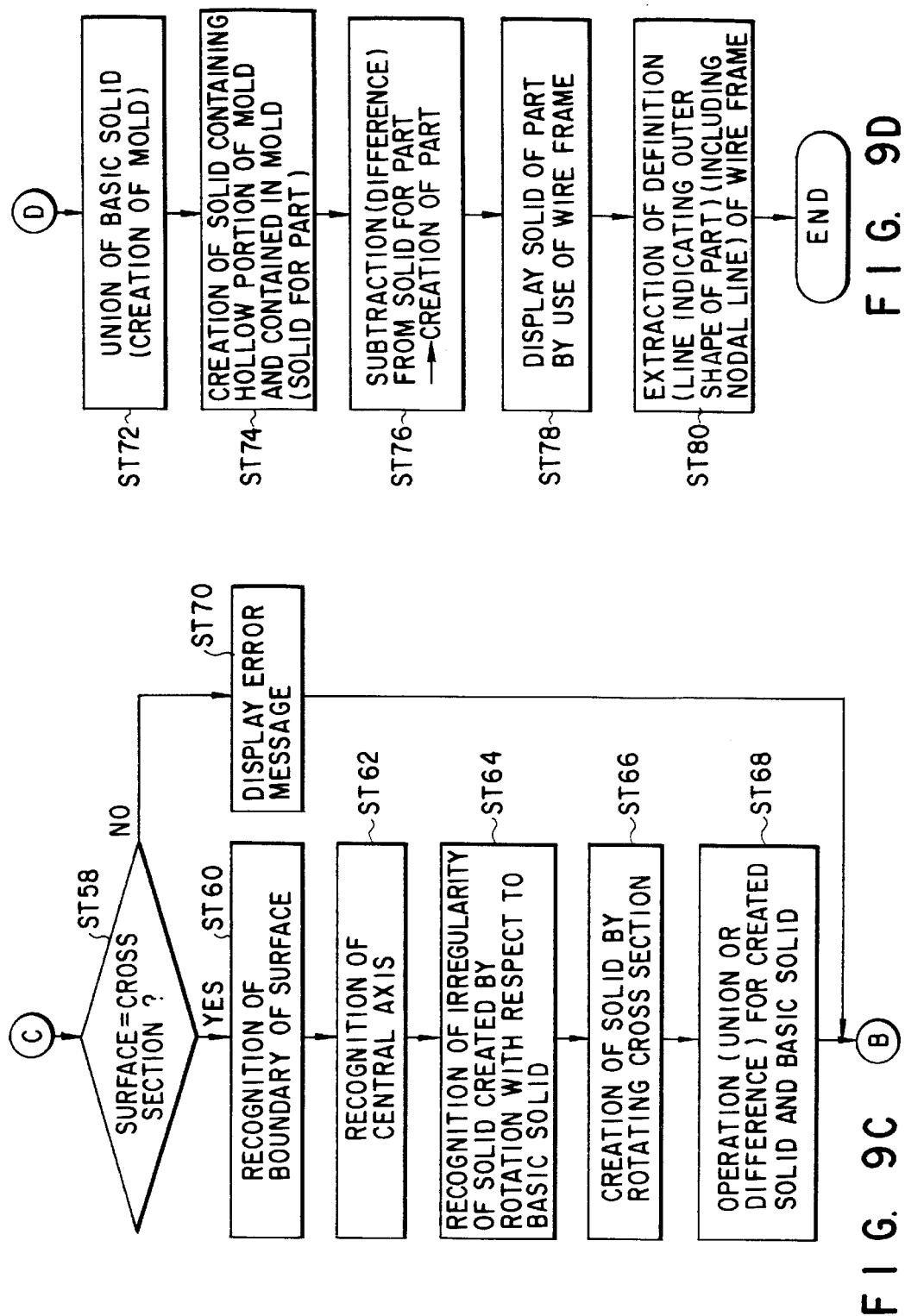

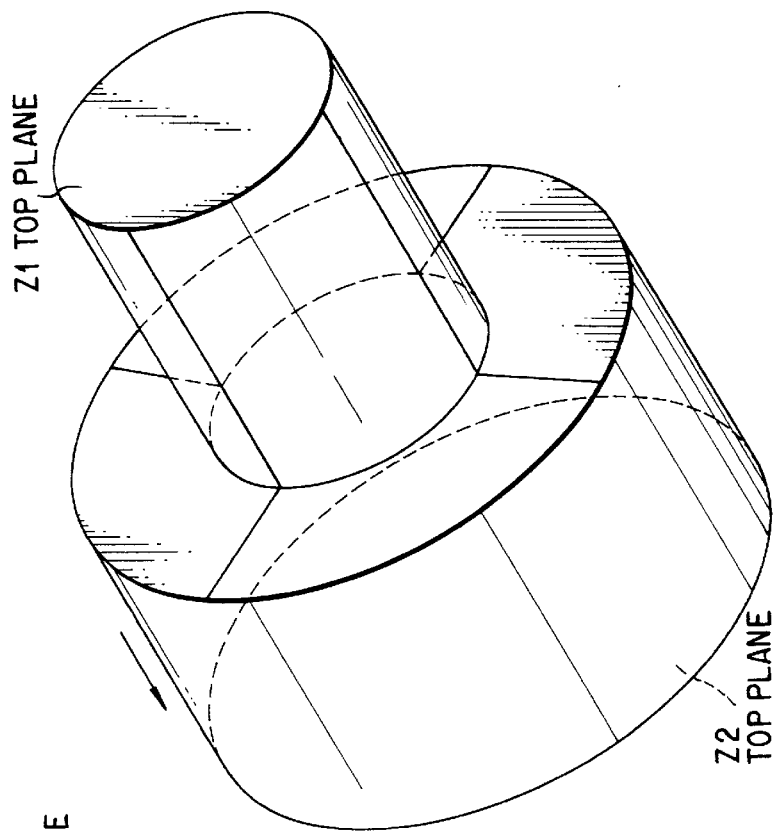
F I G. 12B
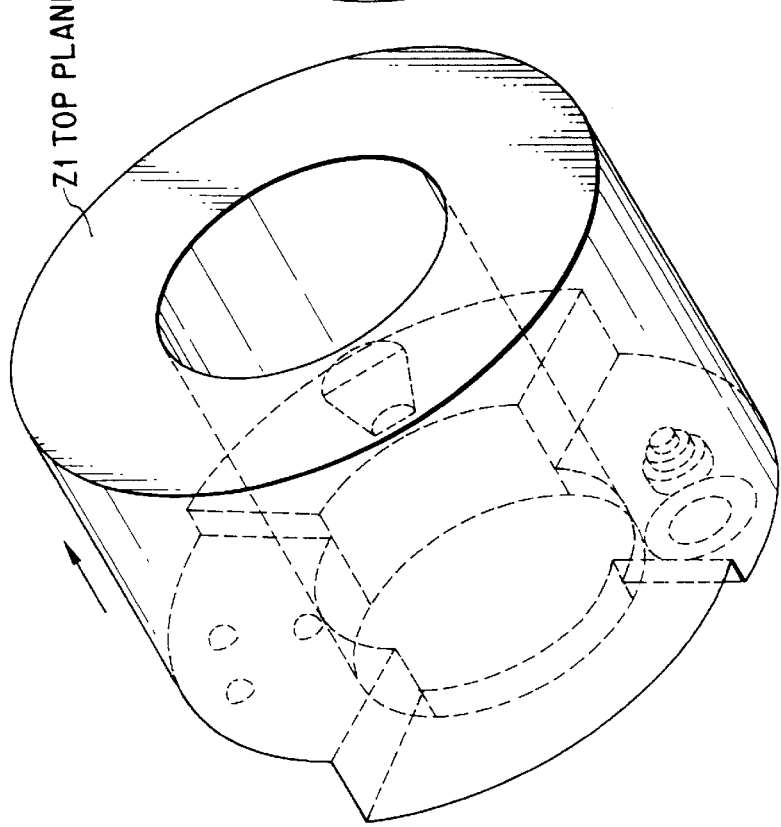
F I G. 12A

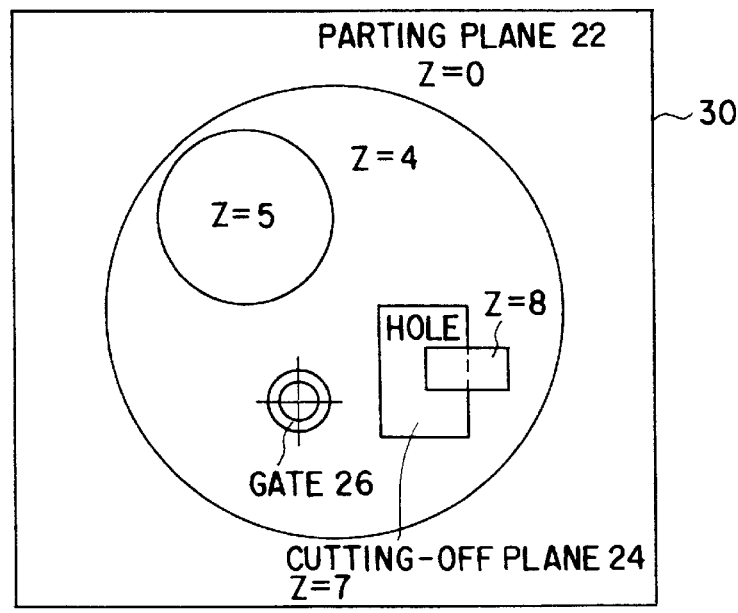
F I G. 14A
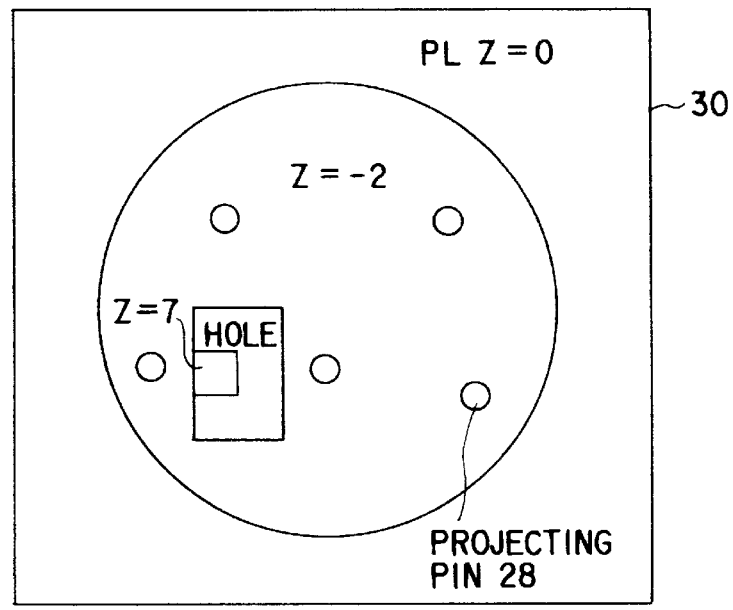
F I G. 14B

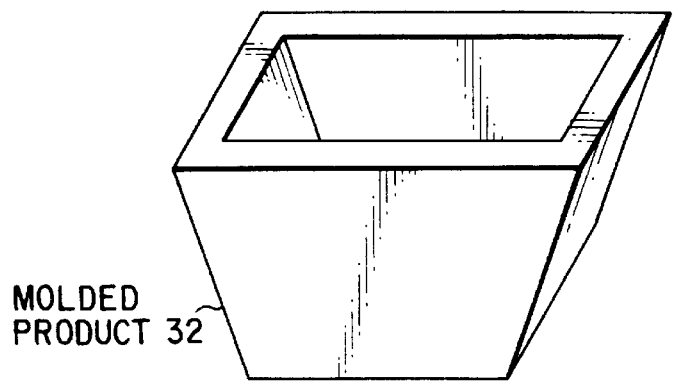
F I G. 15A
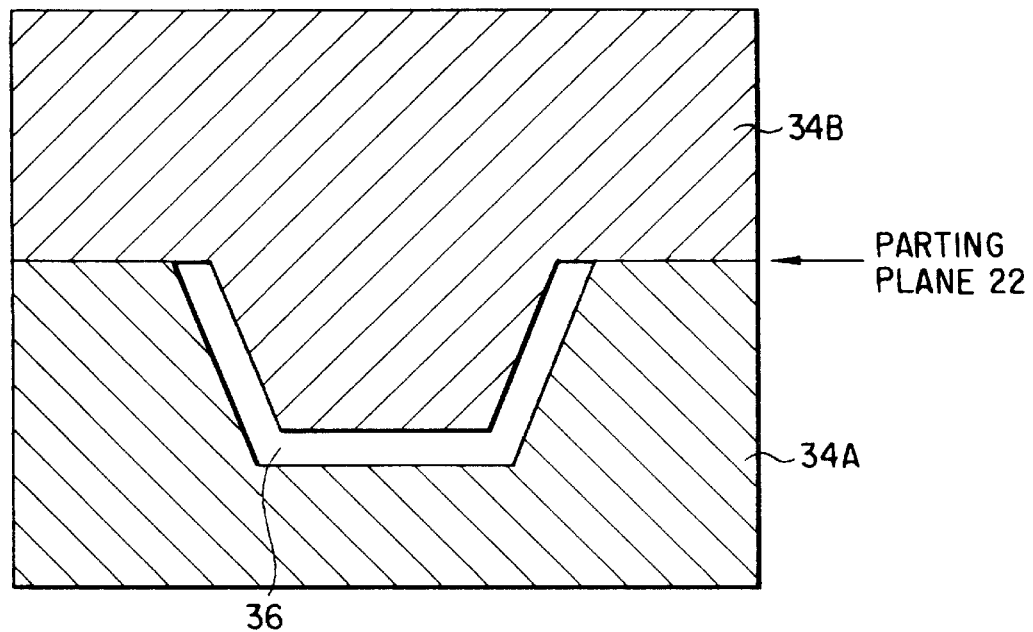
F I G. 15B

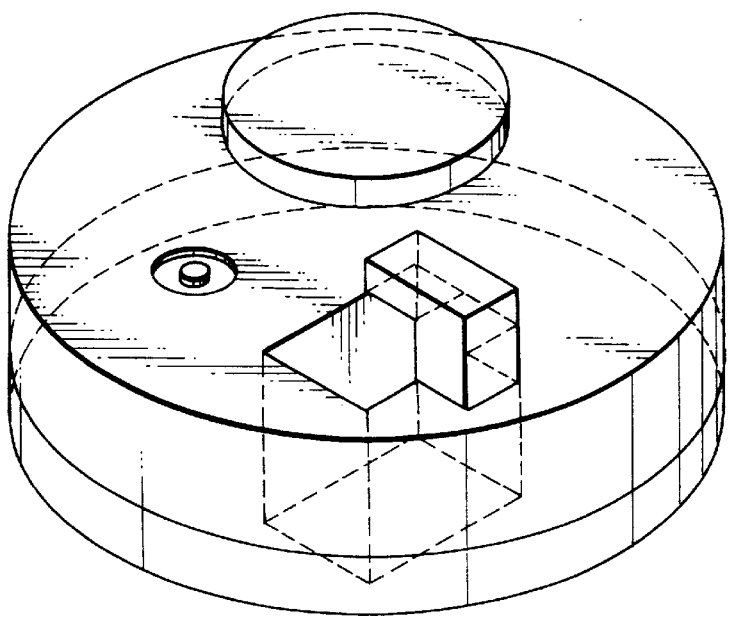
F I G. 17
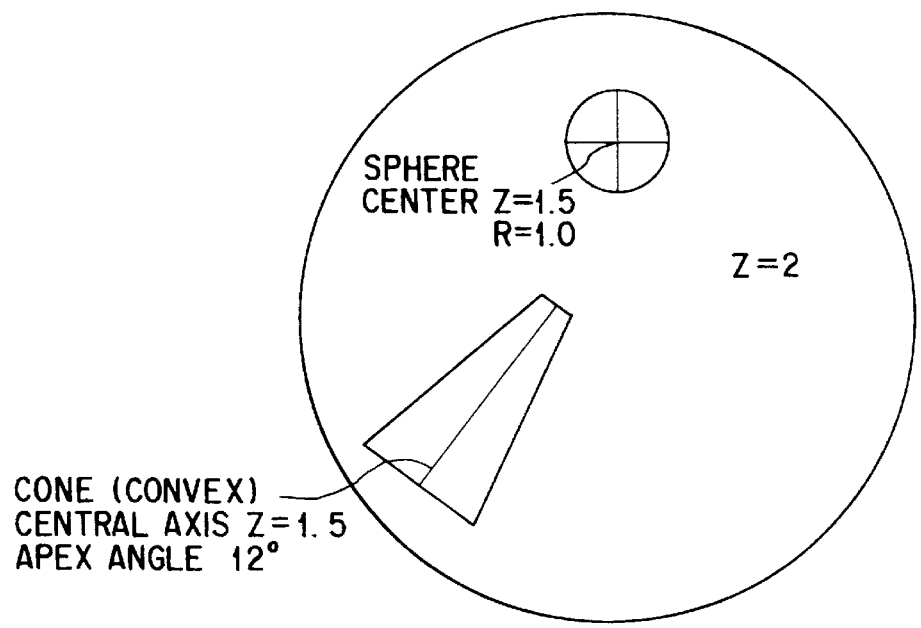
F I G. 20

```
//-Name
//-Originator:b3231
//-Originated:(RAP)Man May 15 11:47:06 1995
//-Product   :EMS PowerPak 03.01.00.13
//-Nodename  :ip7
//-Command   :
//-Comments  :

#include "ciminimum.h"
#include "cimacros.h"
#include "exfi.h"

main()
{
/*PROJECT BOUNDARY AND DERIVE SUM BY BOOLEAN OPERATION
  TO CREATE MOLD*/
/*PART HAVING PLANE CONTAINING CONICAL CONVEX PORTION
  ONLY IN ONE PORTION*/
/*CORESSPONDING TO PART OBTAINED BY REMOVING TORUS
  PORTION, BOSS PORTION,SPHERE PORTION,INCLINED SURFACE
  PORTION OF PART OF FIG.13*/ double pt[3];
    struct EXFI_data_st formData;
    double zdepth[256] u_hight l_hight;
    char   name[256] wink[256];

/*PROJECTION OF BOUNDARY*/
    ci$get_element_info(zdepth=&z_depth, name=&name,
                        wink=&winker)

u_hight=max(zdepth)+10;
    l_hight=min(zdepth)-10;

i=0;

while(name[i]!="/0"){
```

FIG. 21A

```
        if(wink="+"){
              hight=u_hight;
        }
        else{
              hight=l_hight;
        } ci$put(cmd_key="EMPSIPr");//"EMPSIPr""Place Solid of
                                     Projection"

pt[0]=0.0;
pt[1]=0.0;
pt[2]=zdepth[i]
ci$put(point=pt,
       window_name="tp");

pt[0]=0.0;
pt[1]=0.0;
pt[2]=hight[i]
ci$put(point=pt,
       window_name="tp");
}

/*CREATION OF CONE*/
ci$get_elelment_info(center_line=&center,
                     u_rad=&radi, l_rad=&rad2);

ci$put(cmd_key="EMPSICnAxR");//"EMPSICnAxR""Place
                                     Solid Cone by Axis
                                     and Radii"

ci$putevent(
     center=center_line,
     red1=u_rad,
     red2=l_rad,
     name="Cone",
     disp=DRAW);
```

F I G. 21B

```
/*"DRWING" OF CONE PORTION*/
ci$put(cmd_key="EMDfE"*/   //"EMDfE""Difference of
                                   Curves/Surfaces/Solids"

ci$putevent(
      base=solid(name="cone"),
      obj=solid(name="cone");

/*CREATION OF UPPER MOLD*/
k=1;

solid_name[0]="upper_form"

for(j=0;j<i+1;j++){
      if(wink[j]="+"){ solid_name[k]=name[j];
             k++

} ci$put(cmd_key ="EMUnE");   //"EMUnE""Union of
                                   Curves/Surfaces/
                                   Solids"

ci$putevent(solid_name);

/*CREATION OF LOWER MOLD*/
k=1;

solid_name[0]="lower_form"

for(j=0;j<i+1;j++){
      if(wink[j]="-"){ solid_name[k]=name[j];
             k++
```

F I G. 21C

```
        }
ci$put(cmd_key="EMUnE");   //"EMUnE""Union of Curves/
                                    Surfaces/Solids"

ci$putevent(solid_name);

/*CREATION OF PART*/
parts_name[0]="parts_solid";
parts_name[1]="upper_form";
parts_name[2]="lower_form";

ci$put(cmd_key="EMDfE");   //"EMDfE""Difference of
                                    Curves/Surfaces/Solids"

ci$putevent(parts_name);

/*DISPLAY OF NODAL LINE*/ ci$put(cmd_key="WireFrame");

ci$putevent(parts_solid);
```

F I G. 21D

CAD SYSTEM WHICH AUTOMATICALLY CREATES A 3-DIMENSIONAL SOLID MODEL DIRECTLY FROM A 2-DIMENSIONAL DRAWING

BACKGROUND OF THE INVENTION

1. Field of the Invention

This invention relates to a design supporting (CAD) system implemented using a computer.

2. Description of the Related Art

Conventionally, in order to implement a design process, a designer first forms rough sketches called "rough sketch drawings" (NIKKAN KOGYO SHINBUNSHA, Actual Design p. 19 by Yotaro Hatamura) visualizing various design ideas to satisfy the specification, compares and studies the design ideas and selects the best one of the design ideas. After determining the design idea, the spatial arrangement, assembling method, strength and the like are studied based on the determined design idea so as to change the design idea into a more concrete and specific form.

In this process, a drawing indicating the arrangement of parts and elements to be studied is formed by handwriting on (Mylar) section paper to represent information to be designed and studied. Generally, this is implicitly effected, that is, information is represented in a form which can be understood only by the designer or a person in the design organization to which the designer belongs.

For example, in a design organization, it may be implicitly defined that the representation shown in FIG. 1A indicates the engagement of spur gears. Further, it may be implicitly defined that the representation shown in FIG. 1B indicates a convex lens, concave lens, optical axis, image-forming plane and the like. The drawing on which the above design information is represented is called a "scheme drawing".

If the required specification is satisfied in the scheme drawing, then "part drawings" for forming parts are formed based on the scheme drawing. At this time, a part drawing for a part of simple shape can be formed directly from the scheme drawing, but when a part drawing for a part of complicated shape or a moving part used in the mechanism is formed, it is necessary to define the specific shape of the part or specifically define that the part is solid or hollow. The drawing used at this time is called a "solid model definition drawing".

For example, the solid model definition drawing for a part with the shape shown in FIG. 2 may be represented as shown in FIGS. 3A and 3B.

In FIGS. 3A and 3B, the elemental surfaces constructing the part on the front and rear surfaces of the part are implicitly defined. In this case, Z=10 indicates that the surface on which it is written is a plane and the height of the surface in the Z direction is 10. In the solid model definition drawing, the boundaries between the respective surfaces are indicated.

Thus, information relating to the shape is also implicitly represented in the scheme drawing and solid model definition drawing. Therefore, with respect to standards such as the ISO standard, the drawing standard for the part drawing is perfectly provided, but the standards for the scheme drawing and the solid model definition drawing for defining the shape are not provided at all.

Recently, computers have been available for use in the above-described design process, and such CAD (Computer Aided Design) is widely used.

The CAD mainly includes 2-dimensional CAD and 3-dimensional CAD.

The 2-dimensional CAD uses a computer for effecting the drawing service which was effected in handwriting by the drafter and enhances the efficiency of the work by storing the part drawing in a data form into a file and using the stored part drawing in the later processing step or for another product. Thus, the 2-dimensional CAD is mainly used for formation of the part drawing. FIG. 4 shows the part drawing for a part of the shape shown in FIG. 2.

The 3-dimensional CAD uses a computer for storing an actual shape in a model form in the computer and make it possible to use the actual shape data more effectively than in the case of 2-dimensional CAD. That is, the 3-dimensional CAD is used to create a solid model as shown in FIG. 2.

Thus, in the present 3-dimensional CAD, it is necessary for the designer to directly input a wire frame model, surface model, or solid model on the computer image plane. If the above models are input, a mental model (image of shape) imagined by the designer and shown in FIG. 3 is displayed as a solid model on the CAD image plane and can be used for checking of interference between the parts, structure analysis (FEM) and NC machining.

However, since the 2-dimensional CAD basically contains no 3-dimensional information, it is impossible to create a solid model.

On the other hand, in the present 3-dimensional CAD, since the operating environment thereof is completely different from the operating environment of the scheme drawing and solid model definition drawing represented by the designer, the designer is required to become expert in the CAD operation or a full-time assistant is required.

Further, since CAD systems require a machine interface quite different from the conventional drawing technique effected by the drafter, it takes a longer time to make a solid model in comparison with formation of a solid model definition drawing in handwriting by the drafter, thereby imposing an extra load on the designer. Further, even after the solid model is completed, it takes a long time to change the solid model if design changes are necessary.

In addition, when a specified shape is created, the shape cannot be attained if a CAD command for the shape is not provided, and even if the solid model is completed, it cannot be used for various design examinations since the data structure of the model may not have been not made public and/or becuase the data structure has been changed by updating of the version of the CAD software so that shape definition information cannot be extracted.

SUMMARY OF THE INVENTION

This invention has been made in view of the above problems and an object of this invention is to provide a design supporting system capable of easily making a change to a model according to a change of design without requiring a designer to become expert in CAD operation and without requiring the designer to spend time to create a solid model, by automatically creating a solid model. According to a first aspect of this invention, there is provided a design supporting system comprising shape inputting means for inputting a projected shape represented by the 2-dimensional shape of a part; shape attribute inputting means for inputting shape attributes relating to the projected shape together with the projected shape input by the shape inputting means; storage means for combining and storing the projected shape input by the shape inputting means and the shape attribute input by the shape attribute inputting means; shape processing means containing a plurality of command groups used for converting 2-dimensional information into 3-dimensional information; and conversion controlling means for creating a solid model by controlling the plurality of command groups in the shape processing means based on the projected shape and shape attribute stored in the storage means.

According to a second aspect of this invention, there is provided a design supporting system comprising shape inputting means for inputting the 2-dimensional shape of a part; shape attribute inputting means for inputting defined shape attribute information for converting the 2-dimensional shape input by the shape inputting means into a 3-dimensional shape; and creating means for automatically creating a solid model based on the 2-dimensional shape input by the shape inputting means and the shape attribute information input by the shape attribute inputting means.

According to a third aspect of this invention, there is provided a design supporting system comprising storage means for combining and storing 2-dimensional shape information and shape attribute information; shape processing means containing a plurality of 3-dimensional CAD drawing modules used for converting 2-dimensional shape information into 3-dimensional information; and converting means for creating a solid model by controlling the 3-dimensional CAD drawing modules in the shape processing means based on the 2-dimensional shape information and shape attribute stored in the storage means.

According to a fourth aspect of this invention, there is provided a design supporting system comprising storage means for combining and storing a projected shape represented by a 2-dimensional shape of a part and the shape attribute relating to the projected shape; shape processing means containing a plurality of command groups used for converting 2-dimensional information into 3-dimensional information; and conversion controlling means for creating a solid model by controlling the plurality of command groups in the shape processing means based on the projected shape and shape attribute stored in the storage means.

According to a fifth aspect of this invention, there is provided a design supporting system comprising attribute inputting means for inputting attribute information relating to the planes of a 3-dimensional part to represent the shape of the part; storage means for storing the attribute information input by the attribute inputting means; shape processing means containing a plurality of command groups used for converting 2-dimensional information into 3-dimensional information; and conversion controlling means for creating a solid model of the part or a solid model of a forming metal mold by controlling the plurality of command groups in the shape processing means based on the attribute information stored in the storage means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 7 shows an example of description of the shape attribute in the example of FIG. 2;

FIGS. 9A to 9D are flowcharts showing a sequence of operations of the control section;

FIG. 12A is a view showing a solid obtained when all of the boundaries are projected based on shape attribute information corresponding to the solid model definition drawing of FIG. 10A;

FIG. 12B is a view showing a solid obtained when all of the boundaries are projected based on shape attribute information corresponding to the solid model definition drawing of FIG. 10B;

FIGS. 14A and 14B are top and bottom views showing a solid model definition drawing in a second example for illustrating the operation of the control section;

FIGS. 15A and 15B are views for illustrating a parting plane, FIG. 15A being a view showing an example of a molded body and FIG. 15B being a cross sectional view of a mold;

FIG. 17 is a view showing a solid model finally created based on shape attribute information corresponding to the solid model definition drawing of FIGS. 14A and 14B;

FIG. 20 shows a solid model definition drawing obtained by feeding back information of a nodal line based on the solid model of FIG. 19; and FIGS. 21A to 21D show a sequence of programs described by C languages corresponding to the flowcharts shown in FIGS. 9A to 9D for a portion corresponding to a part obtained by removing the torus portion, boss portion, spherical portion and inclined portion of the part shown in FIG. 13.

DETAILED DESCRIPTION OF THE PREFERRED EMBODIMENT

There will now be described an embodiment of this invention with reference to the accompanying drawings.

Figure 5:
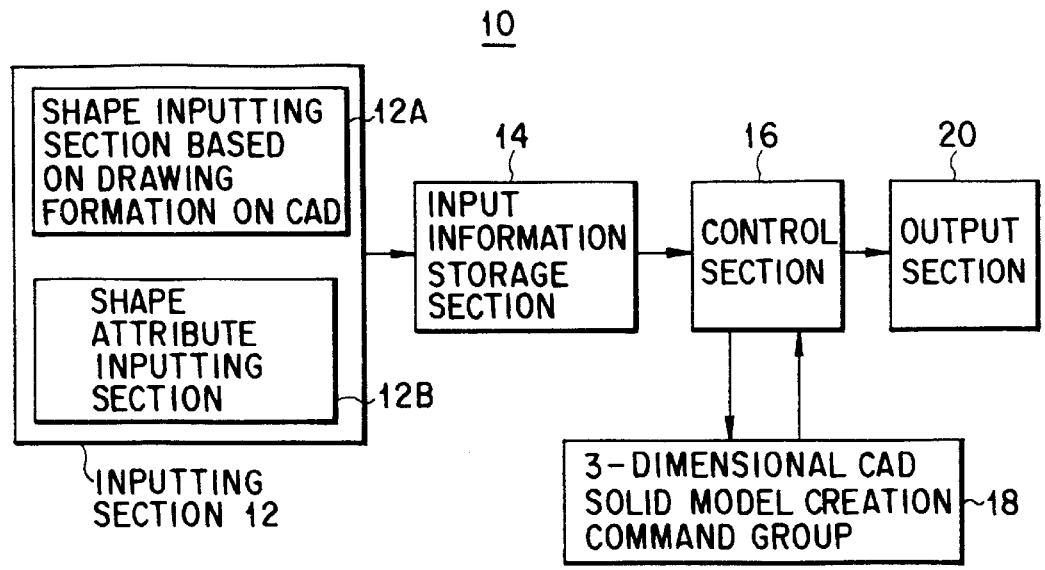
FIG. 5 is a block construction diagram of a design supporting system according to an embodiment of this invention.

FIG. 5 is a block diagram showing the construction of a design supporting system and the design supporting system 10 includes an input section 12, input information storing section 14, control section 16, 3-dimensional CAD solid model creation command group 18 and output section 20.

The input section 12 includes a shape input section 12A based on drawing on the CAD and a shape attribute input section 12B.

Figure 6:
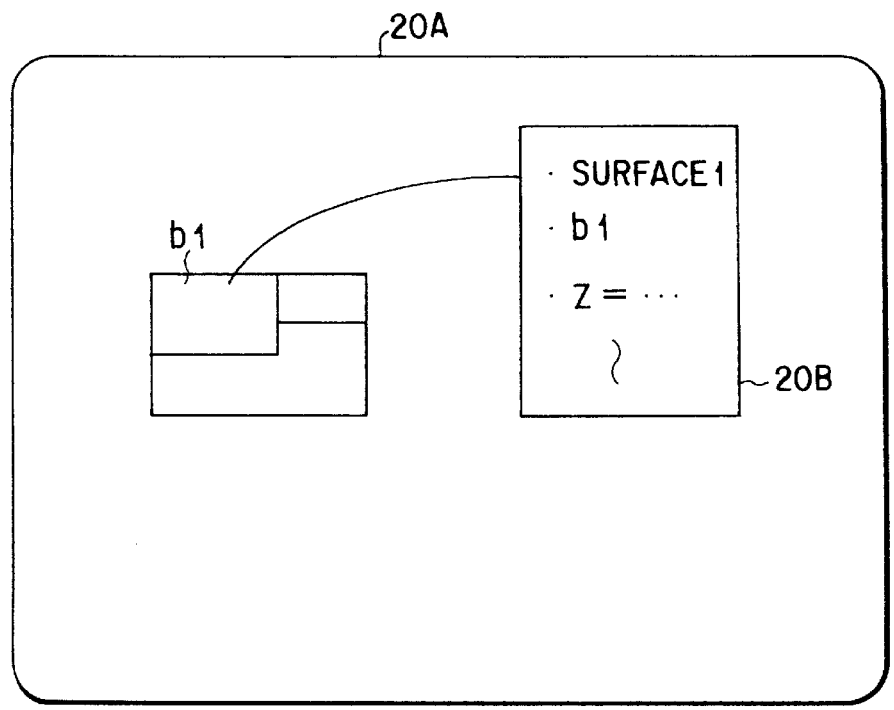
FIG. 6 is a view showing a display example for illustrating the operations of an shape inputting section and shape attribute inputting section based on the drawing formation on the CAD.

As shown in FIG. 6, for example, the shape input section 12A based on drawing on the CAD is used for inputting a projected shape (boundary) as a solid model definition drawing on a CRT image plane 20A constructing part of the output section 20.

Further, the shape attribute input section 12B is used for inputting defined shape attribute information for converting the projected shape input by the shape input section 12A based on drawing on the CAD into a solid model. In order to input the shape attribute by use of the shape attribute input section 12B, for example, each plane (region) in the solid model definition drawing is selected by clicking the mouse to open an input window 20B as shown in FIG. 6 and then each shape attribute is input.

Figure 1A:
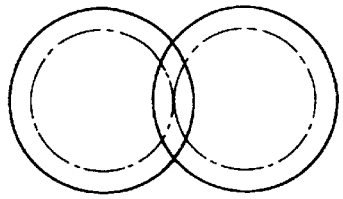
FIGS. 1A and 1B are diagrams showing scheme drawings.
Figure 1B:
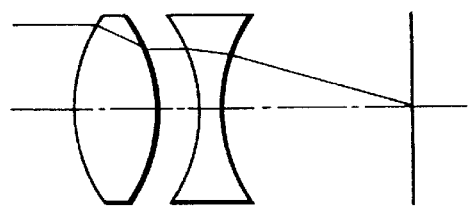
Figure 2:
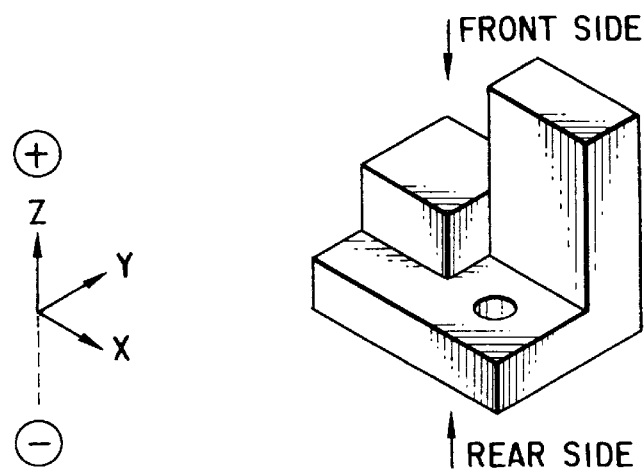
FIG. 2 is a view showing an embodiment of a solid model.
Figure 3A:
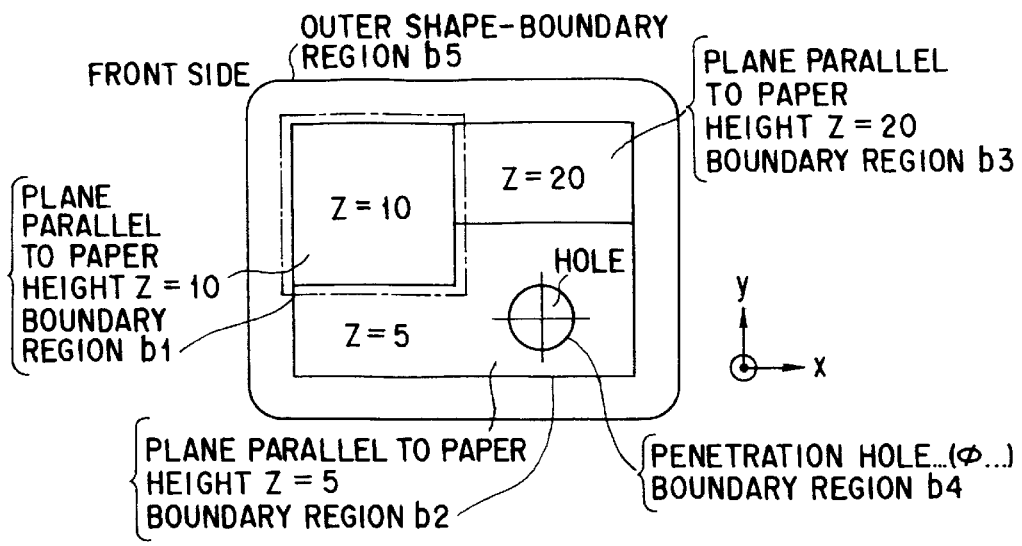
FIGS. 3A and 3B are views showing solid model definition drawings corresponding to the example of FIG. 2.
Figure 3B:
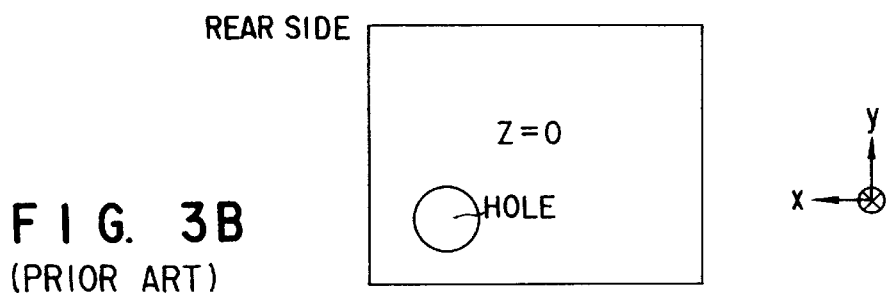
Figure 4:
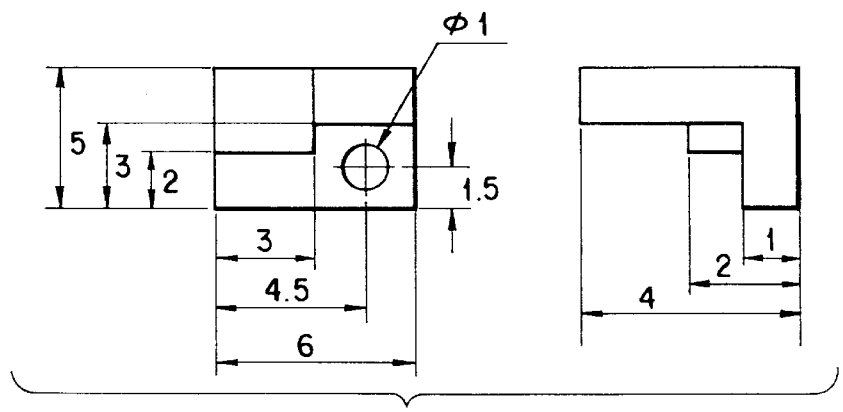
FIG. 4 is a view showing an example of a part drawing.

When an attempt is made to obtain a solid model as shown in FIG. 2, for example, a solid model definition drawing as shown in FIGS. 3A and 3B is input by means of the shape input section 12A based on drawing on the CAD and shape attribute information items as shown in FIG. 7 are input into respective planes by means of the shape attribute input section 12B.

Among the above shape attributes, as "types of surfaces", a plane, cone, sphere, and torus are used in this embodiment. Further, the "boundary region" may be input according to the specification such as IGES which is the specification of CAD data exchange, and as the inputting method, a method of tracing the boundary by use of the mouse or a numerical inputting method by use of the keyboard can be used.

The input information storing section 14 stores the projected shape thus input and the shape attribute information thereof.

The control section 16 creates a solid model according to the 3-dimensional CAD solid model creating command (program) of the 3-dimensional CAD solid model creating group 18 which is the existing solid modeler based on information stored in the input information storing section 14 and then outputs the same to the output section 20 such as a CRT screen, printer or plotter.

Next, the operation of the control section 16 is explained.

First, the concept thereof is explained.

1. First, the projecting direction is checked based on projected shape information stored in the input information storing section 14. In FIG. 7, two projecting directions (Z+ and Z−) opposite to each other are used.

2. Next, the coordinates of the outermost positions in the respective projecting directions are determined based on the types of surfaces, location/position and boundary region information.

Projection: on the front side (Z+): Z1=20
on the rear side (Z−): Z2=0.

Figure 8:
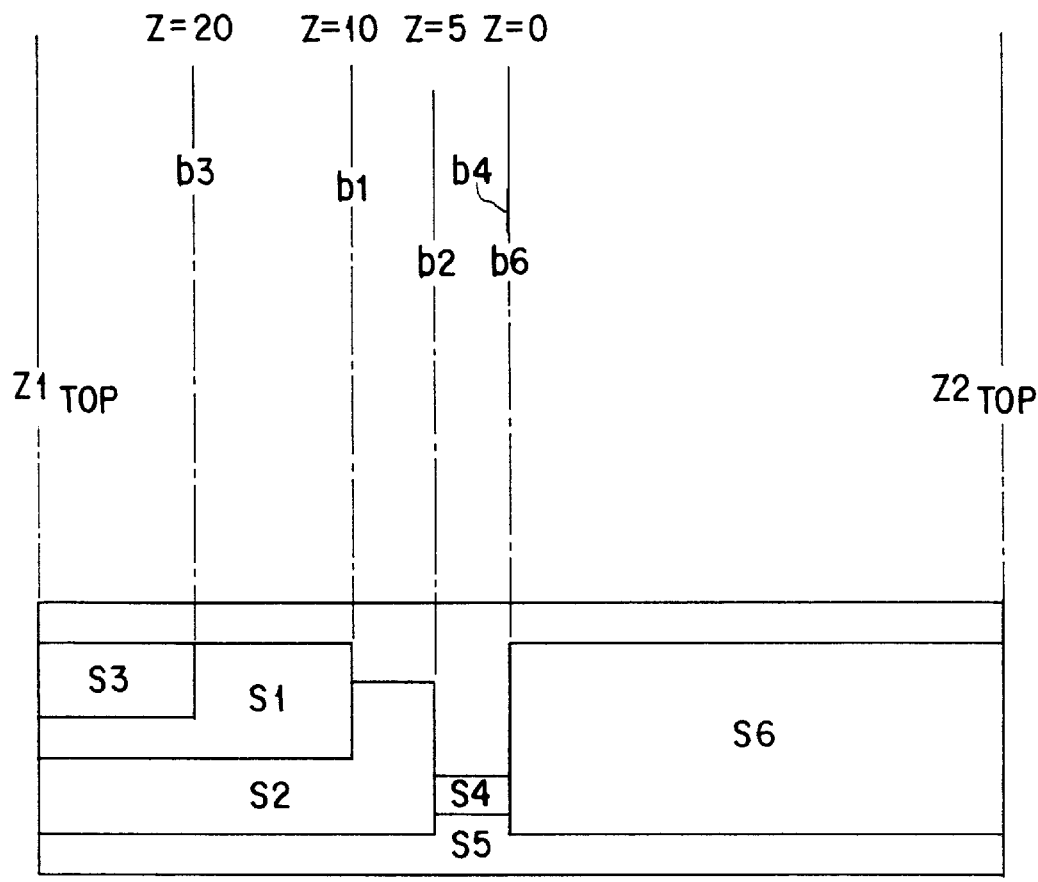
FIG. 8 is a diagram for illustrating the concept of solid model creation.
Figure 9A:
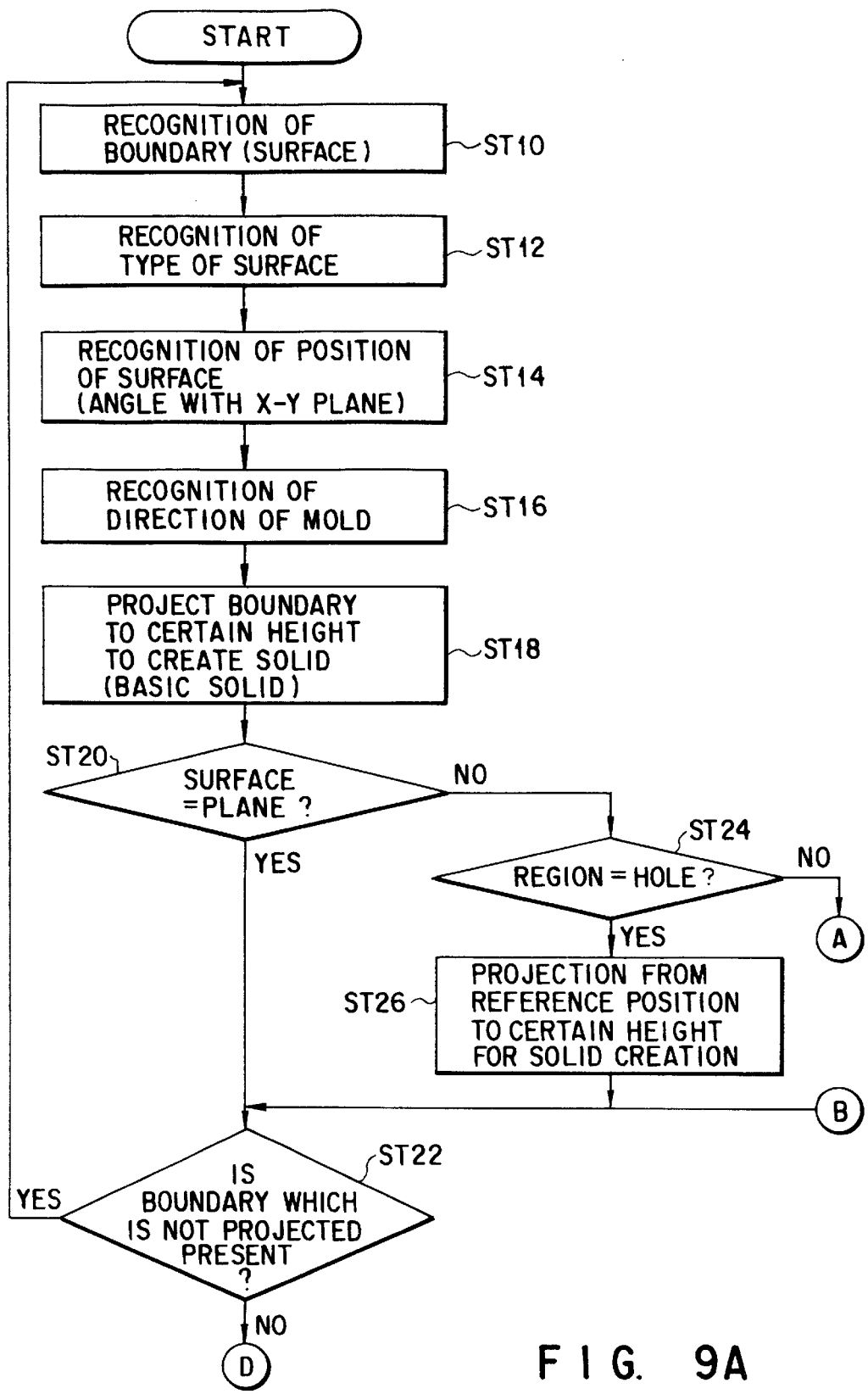
Figure 9B:
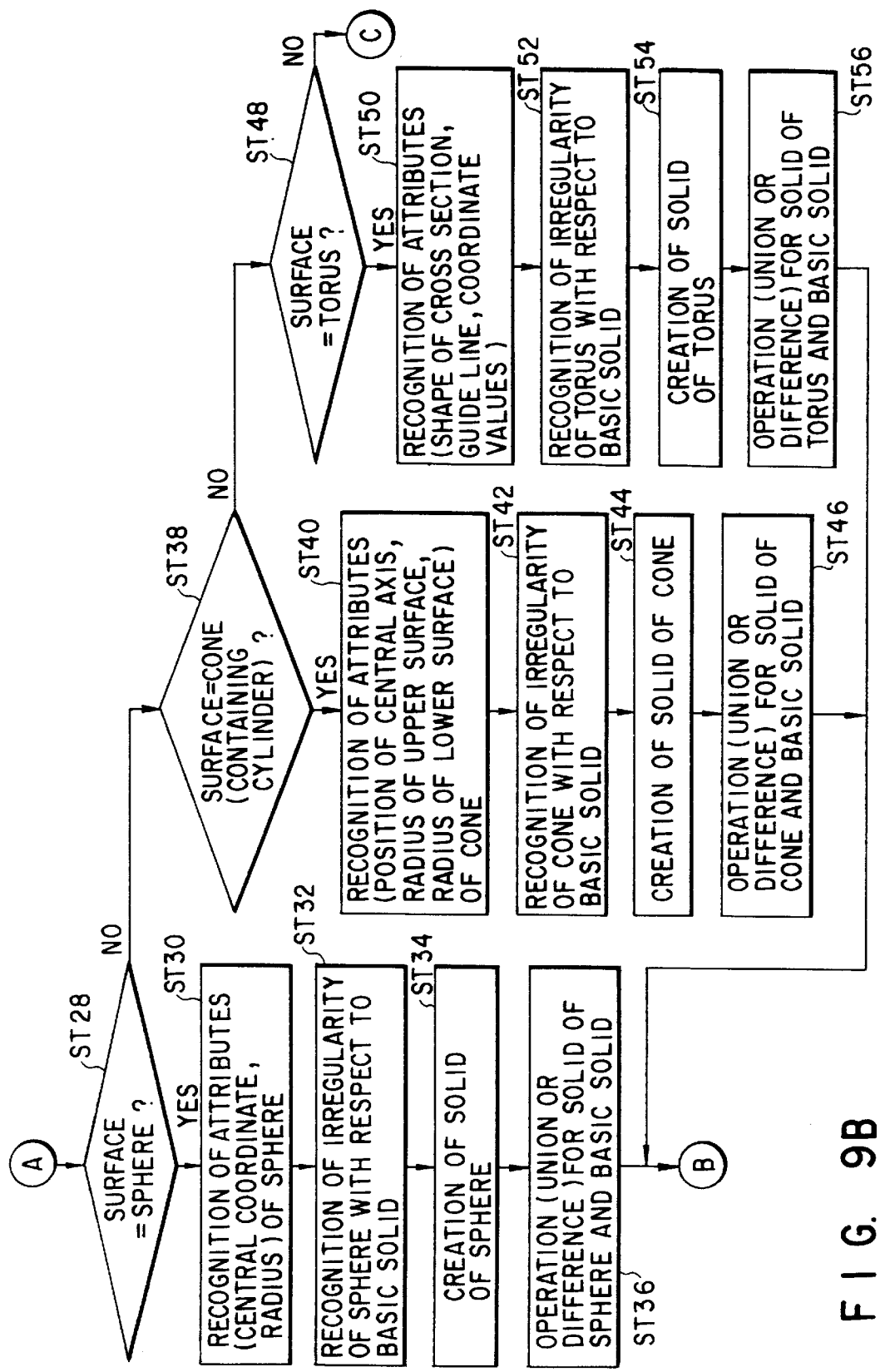

3. Next, boundaries are created in the 3-dimensional CAD by use of the boundary regions b1, b2, b3, b6 of the respective surfaces as shown in the upper portion in FIG. 8. Then, the boundaries are projected to $Z1_{top}$, $Z2_{top}$ which are used as reference heights in a direction opposite to the substantial direction of the respective surfaces by use of solid creation commands stored in the 3-dimensional CAD solid model creation command group 18 so as to create solids S1, S2, S3, S6 as shown in the lower portion of FIG. 8.

4. Next, the outside boundary b5 is projected from $Z1_{top}$ to $Z2_{top}$ by use of outer shape information stored in the input information storing section 14 so as to create a solid S5.

5. After this, the solids S1, S2, S3, S6 created from the respective surfaces are subtracted from the outer shape solid S5 based on the set operation (Boolean operation of the solid model). As a result, a part solid having no penetration hole is created.

6. Finally, the boundary b4 of the penetration hole is created in a solid form between $Z1_{top}$ and $Z2_{top}$ and then subtracted from the outer shape solid S5, then a solid model as shown in FIG. 2 can be obtained.

That is, part=S5−S1−S2−S3−S6−S4.

Thus, as the constituent elements of the part, there are provided planes (horizontal planes, inclined planes), spheres, cones (including cylinders), tori, shapes obtained by rotating various cross sections (which are hereinafter referred to as bosses), holes and the like and the inverted shape of the part shape can be created based on the boundary lines and heights indicating the respective regions (S1, S2, S3, S6, S4). Then, the solid model of the part can be created by subtracting the above solids from the solid (S5) obtained by projecting the outer shape of the solid model definition drawing.

Next, the operation of the control section 16 is explained in detail with reference to a series of flowcharts shown in FIGS. 9A to 9D.

Figures 10A, 10B:
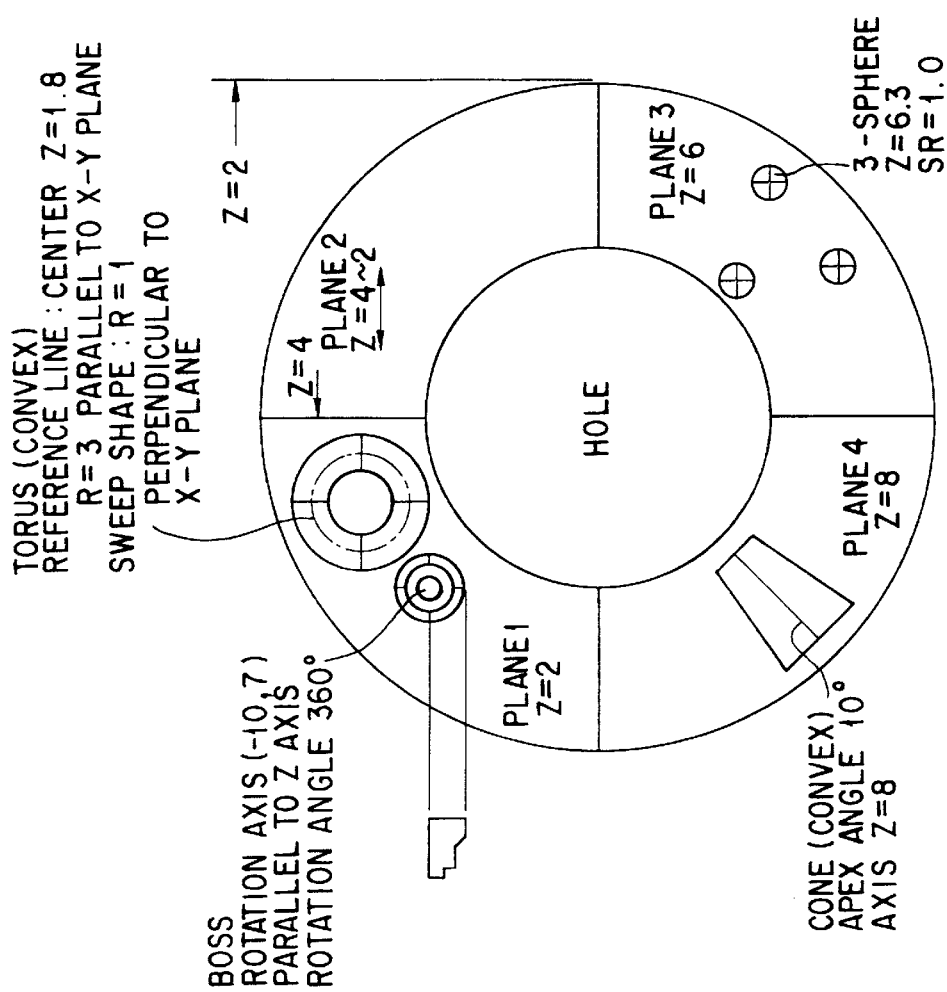
FIGS. 10A and 10B are top and bottom views showing a solid model definition drawing in a first example for illustrating the operation of the control section.

Assume now that the top and bottom views shown in FIGS. 10A and 10B are used as a solid model definition drawing. In the drawings, for brief explanation, shape attributes of the respective surfaces are simultaneously described, but the shape attributes are described in the window as described before. The shape attributes are constructed by boundary lines indicating closed regions, values of the heights of the surfaces and the types of surfaces.

First, the boundary for a certain surface (starting from the surface 1), that is, the surface is recognized (step ST10) and the type of the surface, the position of the surface (angle with respect to the X-Y plane), and the direction of a mold are recognized (steps ST12, ST14, ST16). Then, a solid is created by projecting the boundary to a certain height or heights (the heights $Z1_{top}$, $Z2_{top}$ set as references) (step ST18). The thus obtained solid is hereinafter referred to as a basic solid.

Next, whether the type of the surface recognized in the step ST12 is a plane or not is determined (step ST20), and if it is a plane, then whether a boundary which is not yet projected is present or not is checked (step ST22). If a boundary which is not yet projected is present, the step ST10 is effected again and the above process is effected.

Further, if it is determined in the step ST20 that the surface is not a plane, then whether the region is a hole or not is determined (step ST24). If it is a hole, it is projected from the reference position (in the case of FIGS. 10A and 10B, Z=0) to a certain height to create a solid (step ST26).

After this, the process proceeds to the step ST22, and if a boundary which is not yet projected is present, the step ST10 is effected again and the above process is effected.

Figures 11A, 11B:
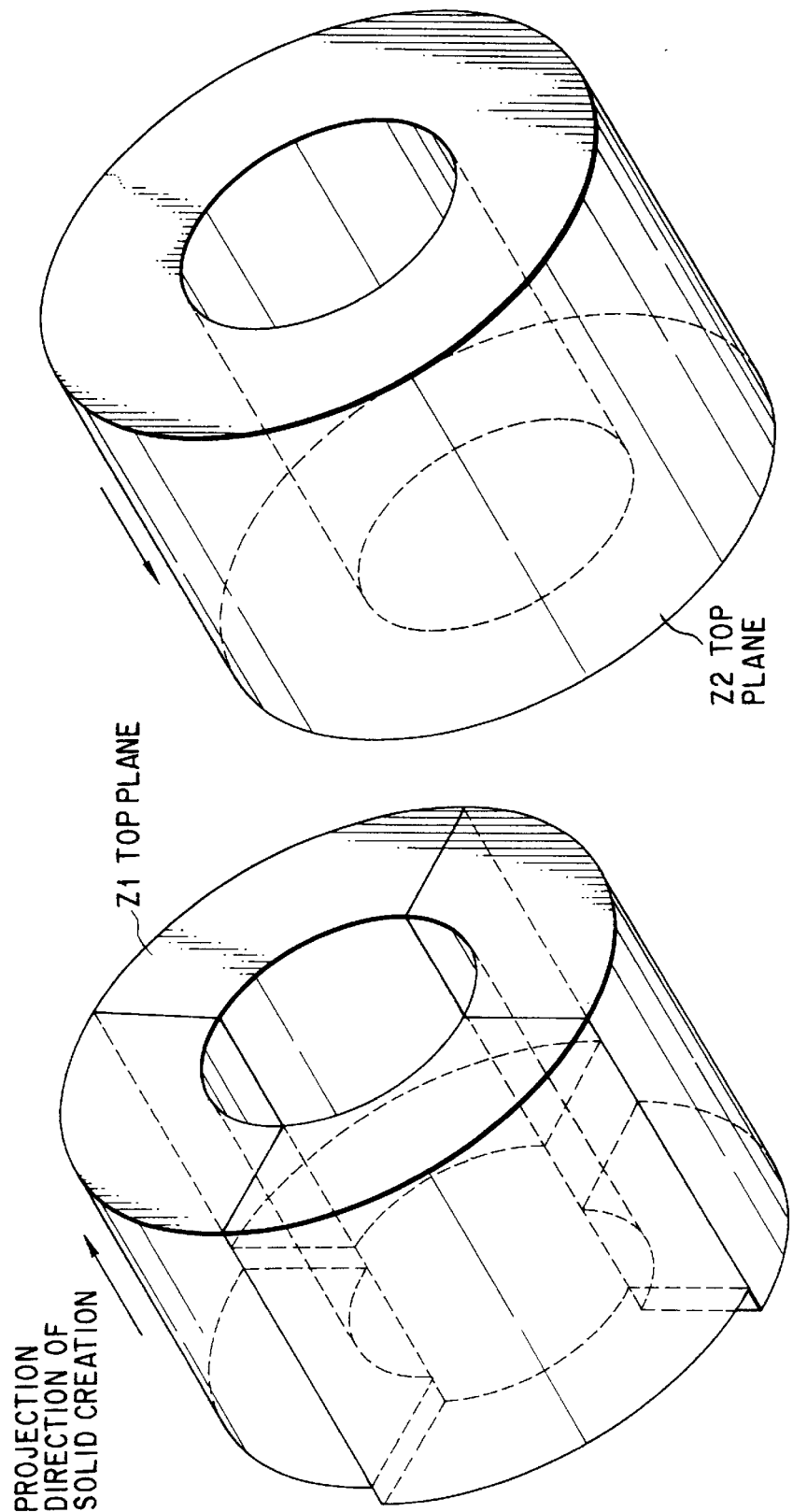
FIG. 11A is a view showing a basic solid created based on shape attribute information corresponding to the solid model definition drawing of FIG. 10A.
FIG. 11B is a view showing a basic solid created based on shape attribute information corresponding to the solid model definition drawing of FIG. 10B.

The thus created basic solids are shown in FIGS. 11A and 11B. The solids are hereinafter referred to as a basic solid 1 and a basic solid 2.

Next, it is determined in the step ST24 that the region is not a hole, whether the surface is a sphere or not is determined (step ST28). If it is a sphere, the attributes (coordinate of the center, radius) of the sphere are recognized (step ST30) and the irregularity with respect to the basic solid of the sphere is recognized (step ST32). Then, the solid of the sphere is created based on the recognized attributes of the sphere (step ST34) and the operation (union or difference) for the created sphere solid and the basic solid is effected based on the recognized irregularity (step ST36). After this, the step ST22 is effected, and if a boundary which is not yet projected is present, the step ST10 is effected again and the above process is effected again.

That is, it is understood that the surface is convex on the part side based on the coordinate of the center of the sphere and the height thereof. Therefore, the spherical solid created based on the coordinate of the center and the radius is subtracted (difference) from the basic solid 1.

Next, if it is determined in the step ST28 that the surface is not a sphere, whether the surface is a cone or not is determined (step ST38). If it is a cone, the attributes (the position of the central axis, the radius of the upper surface, the radius of the lower surface) of the cone are recognized (step ST40) and the irregularity with respect to the basic solid of the cone is recognized (step ST42). Then, the solid of the cone is created based on the recognized attributes of the cone (step ST44) and the operation for the created cone solid and the basic solid is effected based on the recognized irregularity (step ST46). After this, the step ST22 is effected, and if a boundary which is not yet projected is present, the step ST10 is effected again and the above process is effected again.

That is, the cone can be defined by the coordinate of the central axis and the apex angle. Further, a cylinder can be obtained in a case where the apex angle of the cone is 0°. Also, in the case of cone, the specification of convex or concave is made. In the case of FIG. 10A, since it is convex on the part side, the cone solid is subtracted from the basic solid 1 after the cone solid is created.

Next, if it is determined in the step ST38 that the surface is not a cone, whether the surface is a torus or not is determined (step ST48). If it is a torus, the attributes (the shape of the cross section, guide line, coordinate values) of the torus are recognized (step ST50) and the irregularity with respect to the basic solid of the torus is recognized (step ST52). Then, the solid of the torus is created based on the recognized attributes of the torus (step ST54) and the operation for the created torus solid and the basic solid is effected based on the recognized irregularity (step ST56). After this, the step ST22 is effected, and if a boundary which is not yet projected is present, the step ST10 is effected again and the above process is effected again.

That is, the torus can be obtained by the cross sectional shape of the torus and a reference line used for sweeping the cross sectional shape. In this case, since it is not understood that the surface is convex or concave on the part side, the specification of convex or concave is made. In the case of FIG. 10A, since it is convex on the part side, the torus solid is subtracted from the basic solid 1 after the torus solid is created. Next, if it is determined in the step ST48 that the surface is not a torus, whether the surface is a cross section or not is determined (step ST58). If it is a cross section, the boundary and the central axis of the surface are recognized (steps ST60, ST62) and the irregularity with respect to the basic solid of a solid obtained by rotating the cross section is recognized (step ST64). Then, a solid is created by rotating the cross section based on the recognized boundary and central axis (step ST66) and the operation for the created solid and the basic solid is effected based on the recognized irregularity (step ST68). After this, the step ST22 is effected, and if a boundary which is not yet projected is present, the step ST10 is effected again and the above process is effected again.

That is, the boss can be defined by the shape of the cross section and the rotation axis. In FIG. 10A, the shape of the cross section is attached to the side portion for explanation, but in practice, it is written on a plane perpendicular to the X-Y plane. In FIG. 10A, since the boss is convex on the part side, the boss portion is subtracted from the basic solid 1.

If it is determined in the step ST58 that the surface is not a cross section, an error message is displayed (step ST70) and the step ST22 is effected again.

The solid created by the above procedure is shown in FIGS. 12A and 12B.

Then, if it is determined in the step ST22 that a boundary which is not yet projected is no more present, the basic solids are combined (UNION) to create a mold (step ST72) and a solid (part solid) containing a hollow portion of the mold and contained in the mold is created (step ST74). Then, a solid of the part is created by subtracting the part solid from the mold (step ST76) and displayed on the CRT image plane (step ST78). After this, the definition of the wire frame (line representing the outer shape of the part) is extracted from the solid (step ST80) and the process is terminated. The definition of the wire frame contains the nodal line (the boundary between two planes on the 3-dimentions).

Figure 13:
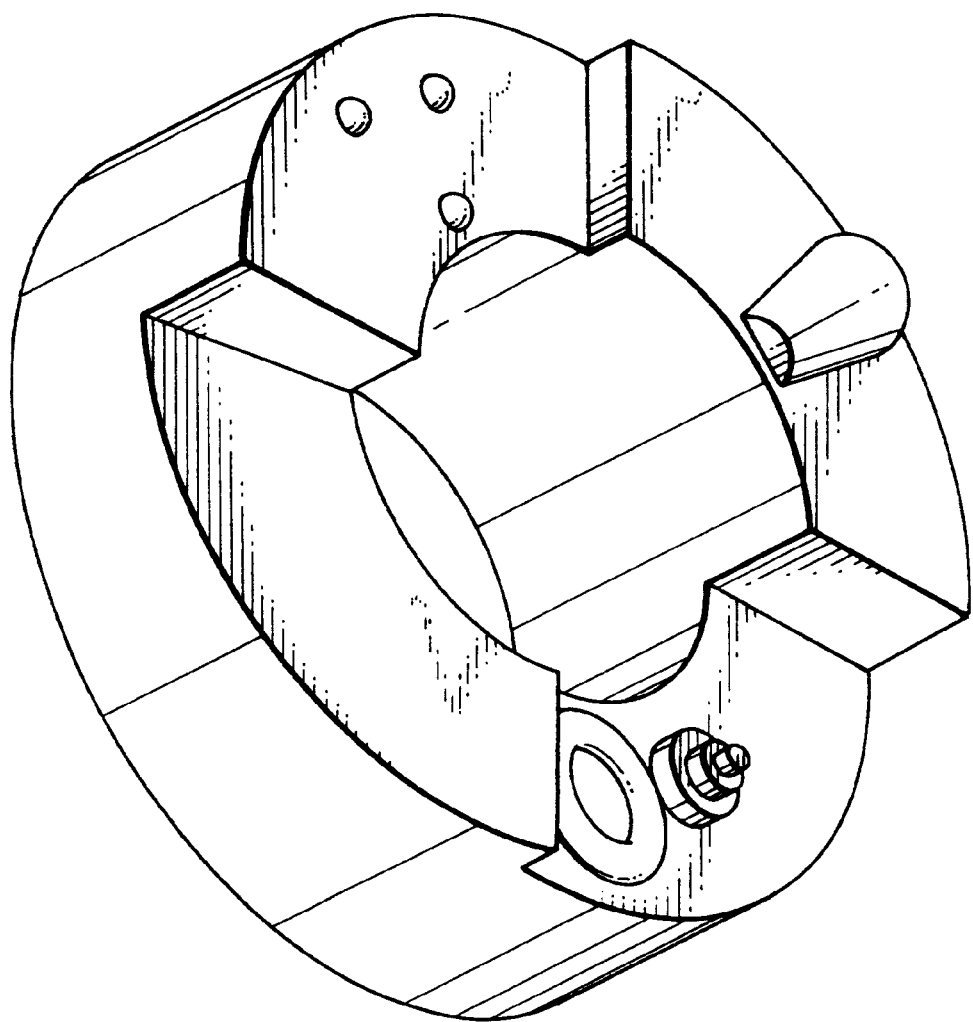
FIG. 13 is a view showing a solid model finally created based on shape attribute information corresponding to the solid model definition drawing of FIGS. 10A and 10B.

That is, a solid obtained by subtracting the solid shown in FIGS. 12A and 12B from the solid (cylinder) obtained by projecting the outer shape (circle) derived from FIGS. 10A and 10B is the finally obtained part solid. The part solid obtained as the result of subtraction is shown in FIG. 13.

As described above, conventionally, in order to create a solid model, it is first necessary to create elements for constructing the solid in a 3-dimensional fashion and a full-time operator who has mastered the operation performs the operation, but according to this embodiment, a solid model can be created simply by use of the 2-dimensional drawing forming technique equivalent to the normal 2-dimensional CAD effected by the designer and based on definition of the type of the surface and information relating to the height required for conversion into the 3-dimensional form by automating the creation of solids.

When an actual part is created, a mold created in the step ST72, that is, a so-called metal mold is created and a part is created by filling resin or the like into the mold. Therefore, it becomes necessary to define the positions of projecting pins and gate used for actual injection molding or the like.

In this case, for example, in part definition views as shown in FIGS. 14A and 14B, not only the definition of the part but also the definition of the mold, that is, a parting plane 22, a cutting-off plane 24 for setting the upper and lower metal molds to face each other, a gate 26, projecting pins 28 and the outer shape 30 of the mold are given.

The parting plane 22 is a plane (corresponding to a plane of Z=0) for dividing the mold into two sections (that is, when a molded product 32 shown in FIG. 15A, for example, is created, a fixed-side mold 34A and a movable-side mold 34B shown in FIG. 15B are combined and resin is filled into a hollow portion 36 to create the molded product 32. A plane on which the fixed-side mold 34A and the movable-side mold 34B are set in contact with each other is called the parting plane 22). Further, the cutting-off plane 24 is one type of parting plane. Therefore, a mold can be created by creating a solid obtained by projecting the boundary lines representing respective closed regions while considering whether the boundary line lies above or below the parting plane. The cutting-off plane is a type of parting plane, but since the parting plane is Z=0 and the cutting-off plane is Z=7 as shown in FIG. 14A, it is understood that the lower side mold extends to the cutting-off plane in a convex form and the upper side mold extends to the cutting-off plane in a concave form.

The gate 26 is a hole used for filling resin at the time of injection molding, and the projecting pin 28 is a pin inserted from the exterior to separate the molded part from the mold.

The gate 26 makes the mold or part in a concave form. Further, since the projecting pin 28 lies on the same plane as the mold, it is projected in a direction of the mold.

Figure 16B:
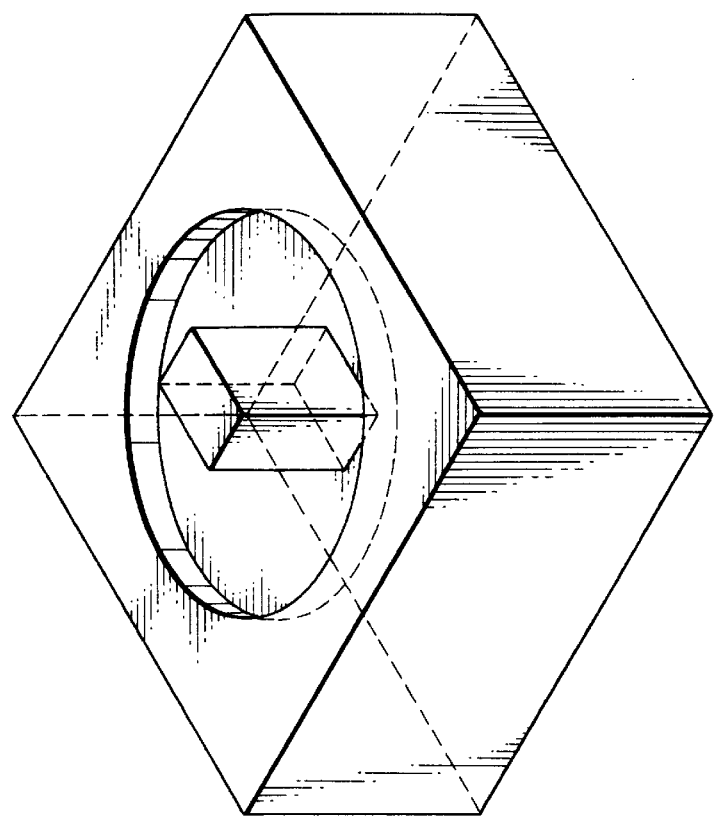
FIG. 16B is a view showing a solid of a mold obtained based on shape attribute information corresponding to the solid model definition drawing of FIG. 14B.
Figure 16A:
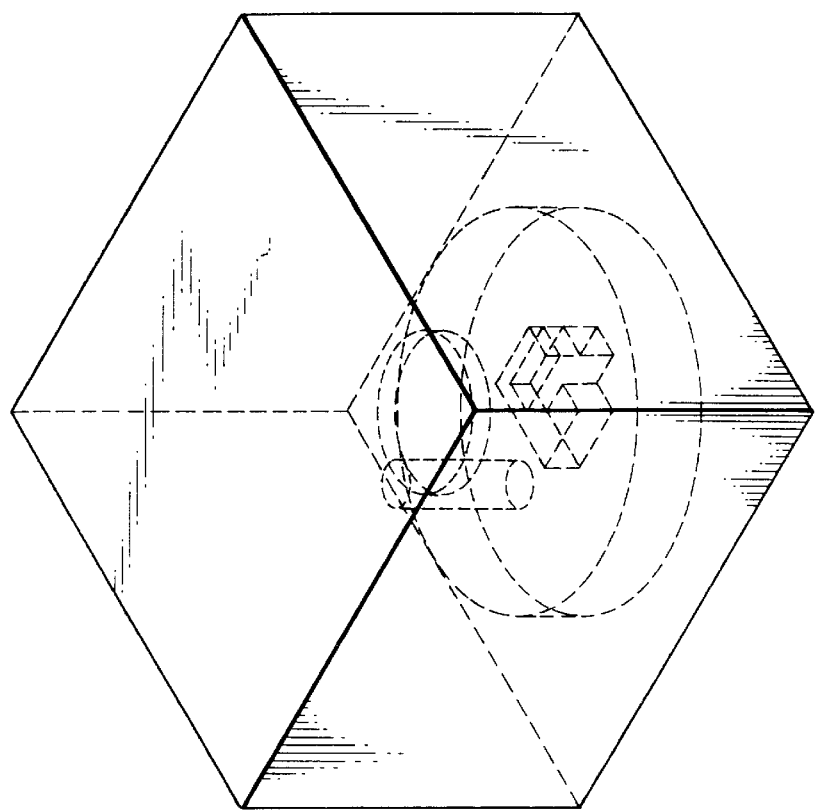
FIG. 16A is a view showing a solid of a mold obtained based on shape attribute information corresponding to the solid model definition drawing of FIG. 14A.

By the above procedure, the solid of the mold created in the step ST72 is shown in FIGS. 16A and 16B.

Therefore, the solid of a desired part is created as shown in FIG. 17 by subtracting the above mold from the solid contained in the mold and containing a hollow portion in the step ST76.

Thus, generally, the design of a mold is made after the shape of a part is defined, but according to this embodiment, since the mold is also defined when the part is defined, the solid of the mold is automatically created at the intermediate stage of the solid creating process. As a result, not only the solid of the part but also the solid of the mold can be automatically created and the term for manufacturing the part can be greatly shortened.

Further, even if a shape which is different from the actual shape of the part is drawn as the solid model definition drawing, the drawing can be corrected and changed to a drawing which matches with the actual shape of the part by extracting the nodal line in the wire frame defining and extracting process of the step ST80.

Figure 18A:
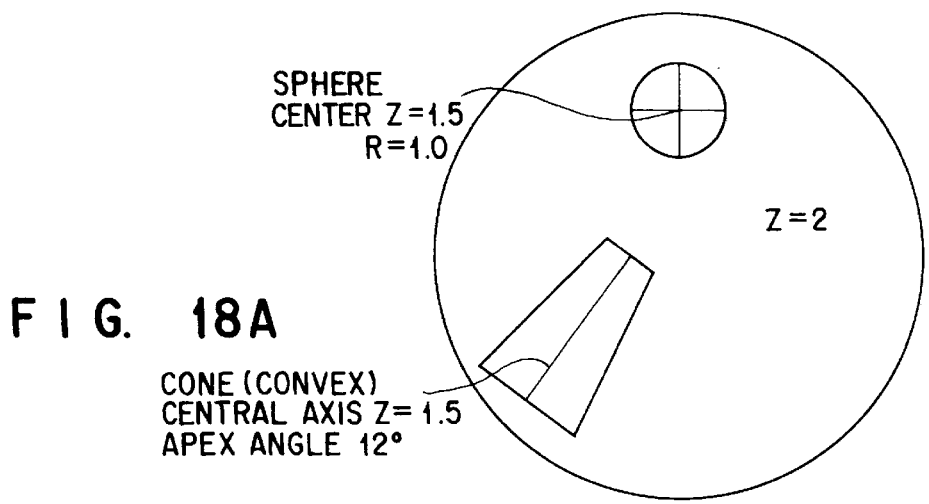
FIGS. 18A and 18B are top and bottom views showing a solid model definition drawing in a third example for illustrating the operation of the control section.
Figure 18B:
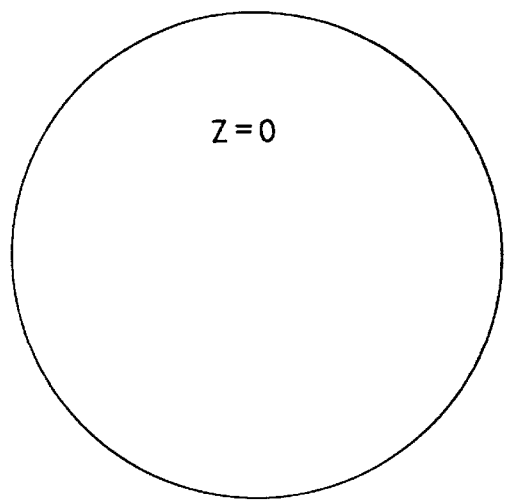

For example, in the top and bottom views of the solid model definition drawing as shown in FIGS. 18A and 18B, the center of the sphere and the central axis of the cone both lie at Z=1.5 and the front surface of the cylinder lies at Z=2. In the solid model definition drawing, the sphere and cone are drawn at Z=1.5 and are clearly different from the shape of the actual upper surface of the part.

Figure 19:
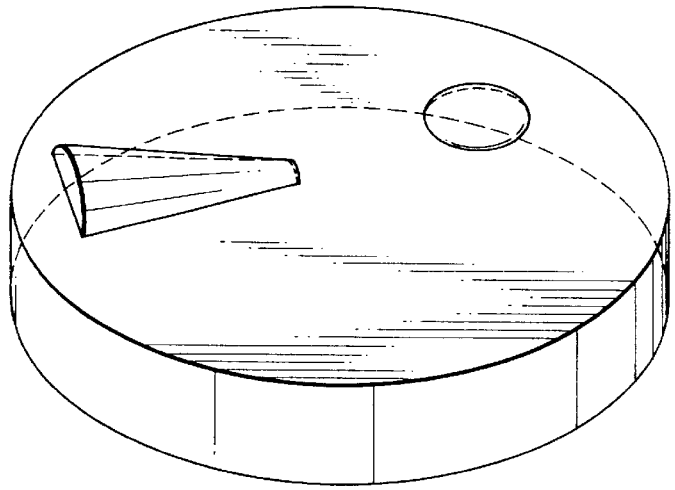
FIG. 19 is a view showing a solid model finally created based on shape attribute information corresponding to the solid model definition drawing of FIGS. 18A and 18B.

If the part solid is created based on information such as the boundary lines and heights of the solid models of the cylinder, sphere and cone as described before, a solid model as shown in FIG. 19 is obtained. In this case, the intersecting lines between the sphere and the cylinder surface and between the cone and the cylinder surface are nodal lines. However, the intersecting line (nodal line) can be easily obtained by creating the solid model. A drawing which matches with the shape of the part can be obtained by feeding information of the nodal line back to the solid model definition drawing. If information of the nodal line is fed back, the solid model definition drawing is converted as shown in FIG. 20.

That is, in the conventional solid model definition drawing, the shape of the nodal line is drawn by calculation or an approximated line is drawn, and an inaccurate drawing has been used. However, according to this embodiment, the nodal line can also be automatically drawn by automatically creating the solid and an accurate drawing of the actual part shape can be obtained.

FIGS. 21A to 21D show the program described in C language and corresponding to the above flowchart for reference. The program shows only the essential part for simplicity, and a case wherein a part corresponding to the part of FIG. 13 from which the torus, boss, sphere, and inclined plane are removed is shown. The language which can be used is not limited to the C language, but another language can be used.

As described above, according to this invention, it is possible to provide a design supporting system capable of easily making a change to a model according to a change of the design without requiring a designer to become expert in CAD operation and without requiring the designer to spend time to create a solid model, by automatically creating a solid model.

That is, by making the shape definition represented in the form of shape attribute, the problem lying in the data structure obtained by use of conventional CAD systems can be solved and it becomes possible to use the shape definition for various design examinations.

Further, since the shape definition is made in the drawing such as the solid model definition drawing or scheme drawing with which the designers are familiar, it becomes unnecessary for the designer to become expert in the CAD operation.

Further, the time necessary for creating the solid model can be rationalized and, for example, it becomes possible to cause the machine to create a solid model outside working hours.

The design change can be made by simply changing the shape definition represented in the form of shape attribute, and no further CAD operation relating to the design change is not necessary.

Further, introduction of the 3-dimensional CAD for use in studying interference between parts, FEM, model design, and NC can be attained by reducing the load for creation of the solid model.

Also, the solid model of the mold can be obtained in addition to the solid model of the part and the process after the design stage and the manufacturing process can be rationalized.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A design supporting system for designing a mechanical part using a 2-dimensional drawing including information with respect to a surface within a region constructed by 2-dimensional elements, the system comprising:

shape inputting means for inputting a projected shape of the mechanical part represented by the 2-dimensional drawing;

shape attribute inputting means for inputting shape attributes relating to the projected shape together with the projected shape input by said shape inputting means;

storage means for combining and storing the projected shape input by said shape inputting means and the shape attribute input by said shape attribute inputting means;

shape processing means including a plurality of command groups used for converting 2-dimensional information into 3-dimensional information; and conversion controlling means for automatically creating a 3-dimensional solid model by controlling the plurality of command groups of said shape processing means based on the projected shape and the shape attribute stored in said storage means.

2. The system according to claim 1, further comprising a shape processor for creating a metal mold.

3. The system according to claim 1, wherein said conversion controlling means includes means for creating a metal mold and then creating the 3-dimensional solid model using the metal mold.

4. The system according to claim 1, wherein said shape processing means includes means for processing a nodal line.

5. The system according to claim 1, wherein said shape attribute inputting means includes means for inputting height data in accordance with a reference height of the projected shape.

6. A design supporting system for designing a mechanical part using a 2-dimensional drawing including information with respect to a surface within a region constructed by 2-dimensional elements, the system comprising:

shape inputting means for inputting a 2-dimensional shape of the mechanical part represented by the 2-dimensional drawing;

shape attribute inputting means for inputting defined shape attribute information for converting the 2-dimensional shape input by said shape inputting means into a 3-dimensional shape; and creating means for automatically creating a 3-dimensional solid model based on the 2-dimensional shape input by said shape inputting means and the shape attribute information input by said shape attribute inputting means.

7. The system according to claim 6, wherein said creating means includes means for storing information relating to a metal mold and means for creating the metal mold when the 3-dimensional solid model is created.

8. The system according to claim 6, wherein said creating means includes means for creating a metal mold and then creating the 3-dimensional solid model using the metal mold.

9. The system according to claim 6, wherein said creating means includes processing means for processing an indistinct boundary portion according to the 2-dimensional shape and the shape attribute information.

10. The system according to claim 9, wherein the indistinct boundary portion comprises a nodal line.

11. A design supporting system for designing a mechanical part using a 2-dimensional drawing including information with respect to a surface within a region constructed by 2-dimensional elements, the system comprising:

storage means for combining and storing 2-dimensional shape information represented by the 2-dimensional drawing and shape attribute information;

shape processing means including a plurality of 3-dimensional CAD drawing modules used for converting the 2-dimensional shape information into 3-dimensional information; and converting means for automatically creating a 3-dimensional solid model by controlling the 3-dimensional CAD drawing modules of said shape processing means based on the 2-dimensional shape information and the shape attribute information stored in said storage means.

12. The system according to claim 11, further comprising:

shape inputting means for inputting the 2-dimensional shape information; and shape attribute inputting means for inputting the shape attribute information together with the 2-dimensional shape information input by said shape inputting means, wherein said storage means combines and stores the 2-dimensional shape information input by said shape inputting means and the shape attribute information input by said shape attribute inputting means.

13. A design supporting system for designing a mechanical part using a 2-dimensional drawing including information with respect to a surface within a region constructed by 2-dimensional elements, the system comprising:

storage means for combining and storing a projected shape represented by the 2-dimensional drawing and a shape attribute relating to the projected shape;

shape processing means including a plurality of command groups used for converting the 2-dimensional shape information into 3-dimensional information; and conversion controlling means for automatically creating a 3-dimensional solid model by controlling the plurality of command groups of said shape processing means based on the projected shape and the shape attribute stored in said storage means.

14. A design supporting system for designing a mechanical part using a 2-dimensional drawing including information with respect to a surface within a region constructed by 2-dimensional elements, the system comprising:

attribute inputting means for inputting attribute information relating to planes of a 3-dimensional part to represent a shape of the part;

storage means for storing the attribute information input by said attribute inputting means;

shape processing means including a plurality of command groups used for converting 2-dimensional shape information represented by the 2-dimensional drawing into 3-dimensional information; and conversion controlling means for automatically creating one of a 3-dimensional solid model of the mechanical part and a 3-dimensional solid model of a forming metal mold by controlling the plurality of command groups of said shape processing means based on the attribute information stored in said storage means.

15. The system according to claim 14, wherein the attribute information includes at least one of boundary information relating to a surface, information indicating a material of the surface, and information indicating a position of the surface.

16. The system according to claim 14, wherein the attribute inputting means includes boundary information inputting means for inputting information relating to a boundary of a surface represented in a 2-dimensional drawing, and value inputting means for inputting other shape information.

17. The system according to claim 14, wherein the attribute information includes information indicating a shape of a mold for creating the part.

18. The system according to claim 17, wherein the information indicating the shape of the mold for creating the part includes information relating to a parting plane.

19. A CAD system for inputting mechanically readable data with respect to a drawing of a part and for outputting metal mold data used for creating a solid model of the part, comprising:

inputting means for inputting independent information relating to surfaces of the part and shapes thereof;

identifying means for identifying the information input by the inputting means such that each one of the surfaces of the part corresponds to the shapes thereof;

determining means for determining a shape type regarding each one of the surfaces of the part, based on the information relating to the shapes thereof identified by the identifying means;

data generating means for individually generating metal mold data used for creating a solid model of the part in accordance with the shape type of each one of the surfaces of the part determined by the determining means;

synthesizing means for synthesizing all of the metal mold data individually generated for each one of the surfaces of the part; and outputting means for converting the metal mold data synthesized by the synthesizing means into information for creating a mold which is used for creating the solid model of the part, and for outputting the information obtained by converting the metal mold data.

20. The CAD system according to claim 19, wherein the shape type of each one of the surfaces of the part is determined to include at least one of a flat surface, an opening, a sphere, a cylinder, a cone, a torus, and a cross-section.

21. A method for inputting mechanically readable data with respect to a drawing of a part and for outputting metal mold data used for creating a solid model of the part, comprising:

an inputting step of inputting independent information relating to surfaces of the part and shapes thereof;

an identifying step of identifying the information input in the inputting step such that each one of the surfaces of the part corresponds to the shapes thereof;

a determining step of determining a shape type of each one of the surfaces of the part, based on the information relating to the shapes thereof identified in the identifying step;

a data generating step of individually generating metal mold data used for creating a solid model of the part in accordance with the shape type of each one of the surfaces of the part determined in the determining step;

a synthesizing step of synthesizing all of the metal mold data individually generated for each one of the surfaces of the part; and an outputting step of: (i) converting the metal mold data synthesized in the synthesizing step into information for creating a mold which is used for creating the solid model of the part, and (ii) outputting the information obtained by converting the metal mold data.

22. The method according to claim 21, wherein the shape type of each one of the surfaces of the part is determined to include at least one of a flat surface, an opening, a sphere, a cylinder, a cone, a torus, and a cross-section.

23. A design supporting system for designing a mechanical part using a 2-dimensional drawing including information with respect to a surface within a region constructed by 2-dimensional elements, the system comprising:

shape inputting means for inputting a projected shape of the mechanical part represented by the 2-dimensional drawing;

region defining means for defining a closed region surrounded by element data comprising the projected shape input by the shape inputting means; and shape attribute inputting means for attaching shape attribute data used for defining a surface shape to the closed region defined by the region defining means.

24. The design supporting system according to claim 23, wherein the element data comprising the protected shape is one of a straight line and a curved line.

25. A design supporting system for designing a mechanical part using a 2-dimensional drawing including information with respect to a surface within a region constructed by 2-dimensional elements, the system comprising:

shape inputting means for inputting by type a plurality of element data with respect to elements comprising a shape of the mechanical part represented by the 2-dimensional drawing;

region defining means for defining a closed region surrounded by element data input by the shape inputting means; and shape attribute inputting means for attaching shape attribute data used for defining a surface shape to the closed region defined by the region defining means.

26. The design supporting system according to claim 25, wherein the element data is one of a straight line and a curved line.

27. A design supporting system for designing a mechanical part using a 2-dimensional drawing including information with respect to a surface within a region constructed by 2-dimensional elements, the system comprising:

shape inputting means for inputting a projected shape of the mechanical part represented by the 2-dimensional drawing;

region defining means for defining a closed region surrounded by element data comprising the projected shape input by the shape inputting means;

shape attribute inputting means for attaching shape attribute data used for defining a surface shape to the closed region defined by the region defining means, and outputting means for making alterations in the closed region in accordance with the shape attribute data, and for outputting the altered closed region.

28. The design supporting system according to claim 27, wherein the element data is one of a straight line and a curved line.

29. A CAD system for inputting mechanically readable data with respect to a 2-dimensional drawing of a part and for outputting metal mold data used for creating a solid model of the part, comprising:

data inputting means for inputting individual element data with respect to surfaces of the part represented by the 2-dimensional drawing, and information relating to at least one of a shape and a height of each one of the surfaces of the part;

solid model data calculating means for calculating data which corresponds to an imaginary solid model of the part by sweeping the element data in parallel with a direction of height in accordance with the information relating to at least one of the shape and the height of each one of the surfaces of the part;

metal mold data generating means for generating metal is mold data used for creating the solid model of the part based on the calculated data which corresponds to the imaginary model of the part; and data outputting means for externally outputting at least the metal mold data used for creating the solid model of the part.

30. The CAD system according to claim 29, further comprising solid model data generating means for generating solid model data for creating the solid model of the part based on the metal mold data, and wherein said data outputting means externally outputs the metal mold data and the solid model data for creating the solid model of the part corresponding to said metal mold data.

* * * * *

UNITED STATES PATENT AND TRADEMARK OFFICE
CERTIFICATE OF CORRECTION

PATENT NO.     : 5,945,995
DATED          : August 31, 1999
INVENTOR(S)    : Higuchi et al.

It is certified that error appears in the above-identified patent and that said Letters Patent is hereby corrected as shown below:

<u>Item [56],</u>
References Cited, after the listing of USP 5,701,403 under "U.S. PATENT DOCUMENTS", insert
-- OTHER PUBLICATIONS
Koivunen, V. et al, "Multiple representation aproach to geometric model construction from range data", IEEE, CAD-Based Vision Workshop, 8/1994.

Dori, D. et al, "Paper Drawings to 3-D CAD: A Proposed Agenda", Document Analysis, 1993 International Conference, pp. 866-869.

Vaxiviere, P. et al, "CELESSTIN IV:
Knowledge-Based Analysis of Mechanical Engineering Drawings", Systems Engineering, 1992 IEEE International Conference, pp. 242-245.

Vaxiviere, P. et al, "CELESSTIN: CAD Conversion of Mechanical Drawings", Computer Magazine, 7/92, pp. 46-54. --

Signed and Sealed this

Twenty-first Day of August, 2001

*Attest:*

*Attesting Officer*

NICHOLAS P. GODICI
*Acting Director of the United States Patent and Trademark Office*